United States Patent
Gosens et al.

(10) Patent No.: US 6,737,455 B2
(45) Date of Patent: May 18, 2004

(54) FLAME RETARDANT POLYESTER COMPOSITIONS

(75) Inventors: Johannes Cornelis Gosens, Roosendaal (NL); Gerrit de Wit, Ossendrecht (NL); Tieb Aouraghe, Vlissingen (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/234,742

(22) Filed: Sep. 3, 2002

(65) Prior Publication Data

US 2003/0022969 A1 Jan. 30, 2003

Related U.S. Application Data

(63) Continuation of application No. 09/738,620, filed on Dec. 15, 2000, now abandoned.

(51) Int. Cl.[7] .............................. C08J 5/10; C08K 5/51; C08L 67/02
(52) U.S. Cl. ....................... 524/138; 524/101; 524/492; 524/493; 524/494; 524/463
(58) Field of Search ................................ 524/101, 127, 524/138, 148, 139, 492, 493, 494, 430, 437, 449, 445, 451, 497, 463

(56) References Cited

U.S. PATENT DOCUMENTS

| | | |
|---|---|---|
| 2,465,319 A | 3/1949 | Whinfield et al. |
| 3,047,539 A | 7/1962 | Pengily |
| 3,953,404 A | 4/1976 | Borman |

FOREIGN PATENT DOCUMENTS

| | | |
|---|---|---|
| EP | 0 661 343 A1 | 7/1995 |
| EP | 0 791 634 A2 | 8/1997 |
| EP | 0 955 333 A2 | 11/1999 |
| JP | 03 281652 | 12/1991 |
| JP | 06 157880 | 6/1994 |
| JP | 11209587 | 8/1999 |
| WO | WO 00/11085 | 3/2000 |
| WO | WO 01/81470 A | 11/2001 |

OTHER PUBLICATIONS

XP–002202335 (Derwent abstract).
XP–002202336 (Derwent abstract).

*Primary Examiner*—Rabon Sergent
*Assistant Examiner*—U K Rajguru
(74) *Attorney, Agent, or Firm*—Oppedahl & Larson LLP

(57) ABSTRACT

A halogen-free, flame retardant polyester composition comprises, based on the total composition,
(a) A poly(ethylene terephthalate) with a molecular weight of at least 50,000 or a blend of poly(ethylene terephthalate) with another polyester, taking into account that the ratio poly(ethylene terephthalate)/other polyester should be at least 55/45.
(b) A combination of at least one N-containing compound, selected from the group of triazine, guanidine, or (iso) cyanurate compounds, and at least one P-containing compound, selected from the group of BPA-diphosphates or phosphoramides with the proviso that the ratio of the total amount of P- and N-containing compounds over the total polyester amount should be between 0.3 and 0.6 and the ratio of the P-containing compound over the N-containing compound should be higher than 0.8.
(c) An anti-dripping agent in an amount of 0.01–2 weight percent of the total composition.
(d) A reinforcing filler in an amount of 0–40 weight percent of the total composition.

31 Claims, No Drawings

FLAME RETARDANT POLYESTER COMPOSITIONS

This application is a continuation of U.S. patent application Ser. No. 09/738,620, filed Dec. 15, 2000 now abandoned.

FIELD OF THE INVENTION

This invention relates to thermoplastic polyester compositions, and in particular to halogen-free, flame retardant thermoplastic polyester compositions.

BACKGROUND OF THE INVENTION

Thermoplastic polyester compositions, such as poly (alkylene terephthalates) have valuable characteristics including strength, toughness, high gloss and solvent resistance. Polyesters therefore have utility as materials for a wide range of applications, from automotive parts to electric and electronic appliances. Because of their wide use, particularly in electronic applications, it is desirable to provide flame retardancy to polyesters. One particular set of conditions commonly accepted and used as a standard for flame retardancy is that which is set forth in Underwriter's Laboratories, Inc. Bulletin 94 which proscribes certain conditions by which material are rated for self-extinguishing characteristics. Another set of conditions commonly accepted and used (especially in Europe) as a standard for flame retardancy is the so-called Glow Wire Test (GWT), the International standard IEC 695-2-1/2.

Numerous flame retarding agents for polyesters are known, but many contain halogens, usually bromine. Halogenated flame retardant agents are however less desirable because of the increasing demand for ecological friendly ingredients. Alternative flame retarding agents have therefore been developed, based on for instance Nitrogen and/or Phosphorus compounds. A general disadvantage of these flame retardant ingredients in polyesters is the negative effect on properties as impact and color stability upon oven aging.

Several N-containing compounds, combined with P-containing compounds have been described as flame retardants for polyesters. JP 03-281652 to Mitsubishi Petrochemical, for example, discloses FR polyester compositions comprising 100 parts of a polyester resin, 30–250 parts of a filler, 5–50 parts of melamine cyanurate, and 5–50 parts of a P-containing FR compound. JP 06-157880 to Akzo Kashima, Mitsubishi Petrochemical, describes a polyester (100 parts) with 30–250 pts of a filler, 5–50 parts of melamine cyanurate and 5–50 parts of an aromatic phosphate. JP11209587 to Kaneka discloses a polyester composition with a) 20–59% Glass and mineral filler in a ratio of 3/2-1/4, b) melamine cyanurate and c) 15–32% P-compound with P-compound/Melamine cyanurate ratio of 1/1–1/3, and d) 0.01–2% Fluoro resin.

Above mentioned literature/patents are suitable for the intended flame-retardant properties, but none of them describes potential limitations of the claimed composition ingredients and the claimed amounts for practical use. Not only good flame retardancy is needed but a combination of good flame retardant properties with good ductility and color stability upon oven aging. The herewith described invention overcomes the described deficiencies.

BRIEF SUMMARY OF THE INVENTION

Non-halogenated flame retardants for polyesters, based on N- and P-containing compounds, are described in the literature. Although good FR-properties can be obtained upon high enough amounts of the FR-ingredients, the materials lack good mechanical properties as impact and/or have insufficient color stability upon heat aging. Desirable enhanced properties and deficiencies can be overcome by the proper choice of the P-compound and the right amounts of N- and P-compounds in relation which each other and in relation with the type and amount of the present polyester. Good balance of ductility, flame retardancy and color stability upon oven aging can be obtained by a flame retardant polyester composition comprising, based on the total composition, (a) A poly(ethylene terephthalate) with a molecular weight of at least 50,000 or a blend of poly(ethylene terephthalate) with another polyester, taking into account that the ratio poly(ethylene terephthalate)/other polyester should be at least 55/45.

(b) A combination of at least one N-containing compound, selected from the group of triazine, guanidine, or (iso)cyanurate compounds, and at least one P-containing compound, selected from the group of BPA-diphosphates or phosphoramides with the proviso that the ratio of the total amount of P- and N-containing compounds over the total polyester amount should be between 0.3 and 0.6 and the ratio of the P-containing compound over the N-containing compound should be higher than 0.8.

(c) An anti-dripping agent in an amount of 0.01–2 weight percent of the total composition.

(d) A reinforcing filler in an amount of 0–40 weight percent of the total composition.

DETAILED DESCRIPTION OF THE INVENTION

A halogen-free, flame retardant polyester composition comprises, based on the total composition, (a) A poly(ethylene terephthalate) with a molecular weight of at least 50,000 or a blend of poly(ethylene terephthalate) with another polyester, taking into account that the ratio poly(ethylene terephthalate)/other polyester should be at least 55/45.

(b) A combination of at least one N-containing compound, selected from the group of triazine, guanidine, or (iso) cyanurate compounds, and at least one P-containing compound, selected from the group of BPA-diphosphates or phosphoramides with the proviso that the ratio of the total amount of P- and N-containing compounds over the total polyester amount should be between 0.3 and 0.6 and the ratio of the P-containing compound over the N-containing compound should be higher than 0.8.

(c) An anti-dripping agent in an amount of 0.01–2 weight percent of the total composition.

(d) A reinforcing filler in an amount of 0–40 weight percent of the total composition.

The flame retardant polyester composition includes a flame retarding quantity of one or a mixture of nitrogen-containing compounds, selected from the group of triazine, guanidine, or (iso)cyanurate compounds. Examples of such compounds are the 1,3,5-triazine compounds as for instance 2,4,6-triamine-1,3,5-triazine (melamine), melam, melem, melon, ammeline, ammelide, 2-ureidomelamine, acetoguanamine, benzoguanamine, diaminephenyltriazine or mixtures thereof. Especially salts/adducts of these compounds with (iso)cyanuric acid (as eg melamine cyanurate), boric acid, and/or phosphoric acid (including the so called melamine polyphosphate) can be used in the composition. Preferred compounds include the cyanuric acid derivatives of 1,3,5-triazine-compounds as melamine cyanurate.

The nitrogen-containing compounds are used in combination with one or more phosphorous-containing compounds as described below, since the combination appears to impart better flame retardant properties than where either component is used alone.

A suitable class of phosphorous compounds is the class of diphosphates of the general structure (OR1)(OR2)P(=O)—OXO—P(=O)(OR3(OR4) (optionally including some oligomeric higher phosphates), for instance made out of POCl3, a diphenol compound HO—X—OH with X is a group with at least 2 aryl unit (such as bisphenol A), and mono-hydroxy compound(s) ROH (R1, R2, R3, R4 might be equal or different), such as phenol. Other suitable phosphorus compounds are phosphoramides such as tetraxylyl piperazine diphosphoramide.

The phosphoramides have the following general structure:

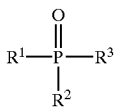

wherein R1 is an amine residue, and R2 and R3 are independently an alkoxy residue, aryloxy residue, aryloxy residue containing at least one alkyl or one halogen substitution or mixture thereof, or amine residue. It is preferred that the phosphoramide have a glass transition point of at least about 0° C., preferably of at least about 10° C., and most preferably of at least about 20° C.

Another phosphoramide comprises a phosphoramide having a glass transition temperature of at least about 0° C., preferably of at least about 10° C., and most preferably of at least about 20° C., of the formula:

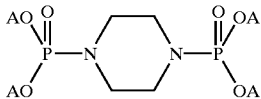

wherein each A is independently phenyl, 2,6-dimethylphenyl, or 2,4,6-trimethylphenyl.

The composition may further optionally comprise various fillers and other additives known in the art, particular glass fibers in an amount of up to about 40 weight percent, and 0.01 to about 2.0 weight percent of at least one anti-dripping agent which retards the tendency of the composition to drip when subjected to burning conditions.

Suitable polyesters that can be blend with the used poly(ethylene terephthalate) include those derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

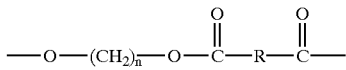

wherein n is an integer of from 2 to 6, and R is a C6–C20 aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4' bisbenzoic acid, and mixtures thereof. All of these acids contain at least one aromatic nucleus. Acids containing fused rings can also be present, such as in 1,4–1,5- or 2,6-naphthalene dicarboxylic acids. The preferred dicarboxylic acids are terephthalic acid, isophthalic acid, naphthalene dicarboxylic acid or a mixtures thereof.

The aliphatic polyols include glycols, such as propylene glycol, butanediol, hydroquinone, resorcinol, trimethylene glycol, 2-methyl-1,3-propane glycol, hexamethylene glycol, decamethylene glycol, cyclohexane dimethanol, or neopentylene glycol.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The most preferred polyesters are poly(ethylene terephthalate) ("PET") as main polyester, poly(1,4-butylene terephthalate), ("PBT"), and poly(propylene terephthalate) ("PPT"). A preferred PBT resin is one obtained by polymerizing a glycol component at least 70 mole %, preferably at least 80 mole %, of which consists of tetramethylene glycol and an acid component at least 70 mole %, preferably at least 80 mole %, of which consists of terephthalic acid, and polyester-forming derivatives therefore. The preferred glycol component can contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol. The preferred acid component can contain not more than 30 mole %, preferably not more than 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethane dicarboxylic acid, p-hydroxy benzoic acid, sebacic acid, adipic acid and polyester-forming derivatives thereof.

Block copolyester resin components are also useful, and can be prepared by the transesterification of (a) straight or branched chain poly(1,2-ethylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like. The branched poly(1,4-butylene terephthalate) resins and their preparation are described in Borman, U.S. Pat. No. 3,953,404, incorporated herein by reference. In addition to terephthalic acid units, small amounts, e.g., from 0.5 to 15 percent by weight of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like.

Fillers and other additives known in the art may be employed to achieve the desired processing and physical characteristics of the flame retardant polyester composition. Typically, such stabilizers are used at a level of about 0.01–10 weight percent and preferably at a level of about 0.05–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The acidic phosphate salts include sodium dihydrogen phosphate, mono zinc phosphate, potassium hydrogen phosphate, calcium dihydrogen phosphate and the like. The phosphites may be of the formula:

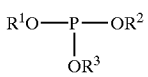

wherein R1, R2, and R3 are independently selected from the group consisting of hydrogen, alkyl and aryl with the proviso that at least one of R1, R2, and R3 is hydrogen or alkyl.

The phosphate salts of a Group IB or Group IIB metal include zinc phosphate, copper phosphate and the like. The phosphorous oxo acids include phosphorous acid, phosphoric acid, polyphosphoric acid or hypophosphorous acid.

The polyacid pyrophosphates maybe of the formula:

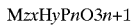

wherein M is a metal, x is a number ranging from 1 to 12 and y is a number ranging 1 to 12, n is a number from 2 to 10, z is a number from 1 to 5 and the sum of (xz)+y is equal to n+2.

Inorganic fillers can impart additional beneficial properties such as thermal stability, increased density, stiffness and texture. Typical inorganic fillers include but are not limited to alumina, amorphous silica, anhydrous aluminum silicates, mica, feldspar, clays, talc, glass flake, glass fibers, glass microspheres, wollastonite, metal oxides such as titanium dioxide, zinc oxide, ground quartz, and the like. Preferred inorganic fillers include zinc oxide, barium sulfate and fiberglass as well as mixtures of the above. Barium sulfate may be in the form of the naturally occurring barites or as synthetically derived barium sulfate. The particle size may vary, and is preferably from about 0.1 to about 50 microns, most preferably from about 1 to about 15 microns.

Where used, fibrous (filamentous) glass can be untreated, but preferably, it will be treated with silane or titanate coupling agents, e.g. Useful filamentous glass is well known to those skilled in the art and is widely available from a number of manufacturers. For compositions ultimately employed for electrical uses, it is preferred to use fibrous glass filaments comprised of lime-aluminum borosilicate glass that is relatively soda free, commonly known as "E" glass. However, other glasses are useful where electrical properties are not so important, e.g., the low soda glass commonly known as "C" glass. The filaments are made by standard processes, e.g., by steam or air blowing, flame blowing and mechanical pulling. The preferred filaments for plastic reinforcement are made by mechanical pulling. Exemplary filament diameters are in the range from about 0.00012 to 0.00075 inch. The glass filaments may be bundled into fibers and the fibers bundled in turn to yarns, ropes or rovings, or woven into mats, and the like, as is required by the particular end use of the composition. In preparing the molding compositions, it is convenient to use the filamentous glass in the form of chopped strands of from about one-eighth to about 2 inches long, which usually results in filament lengths between about 0.0005 to 0.250 inch in the molded compounds.

When particulate fillers are present, for example in molding compositions, the compositions include from 0 to about 60 weight percent, preferably from about 10 to about 50 weight percent, and most preferably from about 25 to about 40 weight of the total composition. Glass fibers are typically used in quantities from about 0 to about 60 weight percent, preferably from about 10 to about 40 weight percent.

The compositions may also contain one or a mixture of reinforcing filler. Suitable fillers include silica; silicates such as talc or mica; carbon black; and reinforcing fibers, such as carbon fiber, aramide fiber or glass fiber. Glass fibers may be composed of E-glass or alkali metal silicate glass and may comprise short, chopped glass fibers with a circular cross section ranging in diameter from about 2×10–4 to 8×10–4 inch and about 0.2 to 2 cm in length. Such glass fibers are normally supplied by the manufacturers with a surface treatment compatible with the polymer component of the composition, such as a siloxane or polyurethane sizing. When used in the composition, the reinforcing filler is normally included at a level of from about 1 to 40 parts by weight, more preferably from about 5 to 35 parts by weight, per 100 parts by weight of the total polymer composition.

The composition may also include one or more anti-dripping agents which have the properties of preventing or retarding resin from dripping while the resin is subjected to burning conditions. Specific examples of such agents include silicone oils, silica (which also serves as a reinforcing filler), asbestos and fibrillating-type of fluorine-containing polymers. Examples of fluorine-containing polymers include fluorinated polyolefins such as polytetrafluoroethylene, tetrafluoroethylene/hexafluoropropylene copolymers, tetrafluoroethylene/ethylene copolymers, polyvinylidene fluoride and polychlorotrifluoroethylene. Preferred such fluorine-containing polymers have a melt viscosity at 3500C of about 1.0×104 to 1.0×1014 poises. When used, the anti-dripping agent is added to the composition at a level of about 0.05 to 5 parts by weight, more preferably from about 0.1 to 4 parts by weight, based on the weight of the total polymer composition.

The compositions may also contain other conventional additives used in polyester polymer compositions such as stabilizers, mold release agents, plasticizers and processing aids.

Other ingredients, such as dyes, pigments, anti-oxidants, and the like can be added for their conventionally employed purposes.

The compositions can be prepared by a number of procedures. In an exemplary process, the polyester composition, optional amorphous additives, impact modifier and filler and/or reinforcing glass is put into an extrusion compounder with resinous components to produce molding pellets. The resins and other ingredients are dispersed in a matrix of the resin in the process. In another procedure, the ingredients and any reinforcing glass are mixed with the resins by dry blending, then either fluxed on a mill and comminuted, or then are extruded and chopped. The composition and any optional ingredients can also be mixed and directly molded, e.g., by injection or transfer molding techniques. Preferably, all of the ingredients are freed from as much as water as possible. In addition, compounding should be carried out to ensure that the residence time in the machine is short; the temperature is carefully controlled; the friction heat is utilized; and an intimate blend between the resin composition and any other ingredients is obtained.

Preferably, the ingredients are pre-compounded, pelletized and then molded. Pre-compounding can be carried out in conventional equipment. For example, after pre-drying the polyester composition (if necessary) e.g., for four hours at 120° C., a single screw extruder is fed with a dry blend of the ingredients, the screw employed having a long transition section to ensure proper melting. On the other hand, a twin screw extrusion machine, e.g., an extruder with i.e. intermeshing co-rotating screws can be fed with resin and additives at the feed port and reinforcing additives (and other additives) fed downstream. In either case, a generally suitable melt temperature will be about 230 to 300° C.

The pre-compounded composition can be extruded and cut up into molding compounds such as conventional granules, pellets, etc., by standard techniques.

The composition can then be molded in any equipment conventionally used for thermoplastic compositions, e.g., a Newbury type injection molding machine with conventional cylinder temperatures, e.g., 230 to 280° C., and conventional mold temperatures, e.g. 55 to 95° C.

The following examples illustrate the invention. They are set forth as a further description but are not to be construed as limiting the invention thereto. All amounts are by weight percent.

EXAMPLES

All formulations are made by dry-blending of ingredients with exception of BPA-diphosphate, RDP and glass fiber. The blends are subsequently compounded on a WP 25 mm co-rotating extruder, where RDP or BPA-DP and Glass are fed separately down-stream the extruder. Temperature setting was 50–140–265–260–260–260–260–260–275 C, vacuum 0.2 bar and RPM of 300. Molding is done on a Engel 35 tons with temperature setting of 245–255–265–265 (from throat to nozzle) and a mold temperature of 70 C for the PBT-based formulations and 80 C for the PET-based formulations (or otherwise stated). Prior to molding the pellets were pre-dried at 120 C for 4 hrs.

Materials identified in the tables by abbreviations or trade names are as follows:

Poly(butylene terephthalate) with Mw of appr. 80,000 (as expressed as PS molecular weight)
(Poly(ethylene terephthalate) with Mw of appr. 60,000 or 45,000 (expressed as PS molecular weight).

| | |
|---|---|
| RDP | Resorcinol diphosphate |
| BPA-DP | Bisphenol A -diphosphate |
| TSAN | PTFE/SAN blend of PTFE/SAN = 50/50 |
| X4PIP | Tetraxylyl piperazine diphosphoramide |

The flammability of test specimens is evaluated according to the standard Glow Wire Test (GWT) protocol as described in the International standard IEC 695-2-1/2. Ratings of 960 GWT indicate test samples with the best resistance to burning, whereas 850 GWT rating is a lower degree of resistance to burning if it failed at 960 degrees C.

The flammability of test specimen is also evaluated according to the standard UL-94 protocol, vertical burning. Ratings of V0 indicate test samples with the best resistance to burning, whereas V1 and V2 ratings in that order indicate a lessening degree of resistance to burning (V2 with drippings).

Test specimen are evaluated for Izod Impact in accordance with ISO 180. The color of test specimen after oven aging during 500 hours at 150 degrees C. were visually inspected.

Formulations and test results are shown in the table. Amounts are part by weight. It has been surprisingly found that the right balance of properties can be obtained. The following are observations relating to the results. Formulations based on BPA-DP or X4PIP do not show dark brown discoloration upon oven aging (500 hrs at 150 C), in contrast to RDP-containing formulations (Reference samples #1, #3 and #4). Samples with a PET/PBT ratio <55/45 (Reference samples #1, #2, and #3) do not have a V0 rating, even not at high amounts of P- and N-compounds. Samples with a ratio of P+N-cpds/Polyester<0.3 for PET/PBT>55/45 show no V0 rating (Reference samples #5, #6 and #7). Reference sample #8 versus #9 shows that an anti-dripping agent is needed for a V0 rating. Samples with a ratio of P+N-cpds/Polyester>0.6 for a PET/PBT>55/45 show impact properties below 25 kJ/m2 (Reference sample #12), in contrast with samples with a ratio <0.6. Samples with a P-/N-compound ratio <0.8 also show bad impact (Reference sample #5 versus #6, and #11 versus #9). To obtain a material with good impact also a minimum molecular weight is needed; sample #14 is added as Reference.

| Ingredients | #1 (Ref) | #2 (Ref) | #3 (Ref) | #4 (Ref) | #5 (Ref) | #6 (Ref) | #7 (Ref) | #8 (Ref) | #9 | #10 | #11 (Ref) | #12 (Ref) | #13 | #14 (Ref) |
|---|---|---|---|---|---|---|---|---|---|---|---|---|---|---|
| PBT (Mw~ 84,000) | 44.3 | 39.8 | 28 | | | | | | | | | | | |
| PET (Mw ~ 60,000) | | | 15 | 44.8 | 54.8 | 54.8 | 54.6 | 44.8 | 44.3 | 49.3 | 44.3 | 39.3 | 44.3 | |
| PET (Mw ~ 45,000) | | | | | | | | | | | | | | 44.3 |
| RDP | 15 | | 13 | 15 | | | | | | | | | | |
| BPA-DP | | 15 | | | 5 | 10 | 10 | 15 | 15 | 10 | 10 | 15 | | 15 |
| X4PIP | | | | | | | | | | | | | 15 | |
| Mel.Cyan. | 10 | 15 | 13 | 10 | 10 | 5 | 5 | 10 | 10 | 10 | 15 | 15 | 10 | 10 |
| TSAN | 0.5 | 0.5 | 0.6 | | | | 0.2 | | 0.5 | 0.5 | 0.5 | 0.5 | 0.5 | 0.5 |
| GF | 30 | 30 | 30 | 30 | 30 | 30 | 30 | 30 | 30 | 30 | 30 | 30 | 30 | 30 |
| Stab/Pigments | 0.2 | 0.2 | 0.4 | 0.2 | 0.2 | 0.2 | 0.2 | 0.2 | 0.2 | 0.2 | 0.2 | 0.2 | 0.2 | 0.2 |
| P + N-cpds/Polyester | 0.56 | 0.75 | 0.6 | 0.56 | 0.27 | 0.27 | 0.27 | 0.56 | 0.56 | 0.41 | 0.56 | 0.76 | 0.56 | 0.56 |

-continued

| Ingredients | #1 (Ref) | #2 (Ref) | #3 (Ref) | #4 (Ref) | #5 (Ref) | #6 (Ref) | #7 (Ref) | #8 (Ref) | #9 | #10 | #11 (Ref) | #12 (Ref) | #13 | #14 (Ref) |
|---|---|---|---|---|---|---|---|---|---|---|---|---|---|---|
| P-/N- compound | 1.5 | 1 | 1 | 1.5 | 0.5 | 2 | 2 | 1.5 | 1.5 | 1 | 0.67 | 1 | 1.5 | 1.5 |
| PET/PBT | 0/100 | 0/100 | 35/65 | 100/0 | 100/0 | 100/0 | 100/0 | 100/0 | 100/0 | 100/0 | 100/0 | 100/0 | 100/0 | |
| Properties | | | | | | | | | | | | | | |
| IUI (kJ/m2) | 44 | 37 | 32 | 32 | 25 | 36 | 38 | 33 | 30 | 33 | 21 | 21 | 26 | 17 |
| UL @ 1.6 mm | NC | NC | V2 | V2 | V2 | V2 | V1/V2 | V2 | V0 | V0 | V0 | V0 | V0 | V0 |
| 960 C GWT @ 1 mm | No Pass | No pass | Pass | Pass | Pass | Pass | Pass | Pass | Pass | Pass | Pass | Pass | Pass | Pass |
| Color after 500 hrs @ 150° C. | Dark Brown | Beige | Dark Brown | Dark Brown | Beige | Beige | Beige | Beige | Beige | Beige | Beige | Beige | Beige | Beige |

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. A halogen-free, flame retardant polyester composition comprising,
   (a) a polyester component comprising poly(ethylene terephthalate);
   (b) a combination of at least one N-containing flame-retardant compound, selected from the group consisting of triazine, guanidine, and (iso)cyanurate compounds, and at least one P-containing flame-retardant compound, selected from the group consisting of bisphenolic diphosphates and phosphoramides with the proviso that the ratio of the total amount by wt. of P- and N-containing compounds over the total polyester amount is between 0.3 and 0.6 and the ratio of the P-containing compound by wt. over the N-containing compound by wt. is higher than 0.8;
   (c) an anti-dripping agent in an amount of 0.01–2 weight percent of the total composition; and
   (d) a reinforcing filler in an amount of 0–40 weight percent of the total composition.

2. The composition of claim 1, further comprising up to about 40 weight percent of glass fiber.

3. The composition of claim 1, wherein the polyester component further comprises another polyester resin different from poly(ethylene terephthalate) and derived from an aliphatic or cycloaliphatic diol containing from 3 to 10 carbon atoms and at least one aromatic dicarboxylic acid.

4. The composition of claim 1, wherein the other polyester has repeating units of the following general formula:

$$-O-(CH_2)_n-O-\overset{O}{\underset{\|}{C}}-R-\overset{O}{\underset{\|}{C}}-$$

wherein n is an integer of from 3 to 6, and R is a C6–c20 aryl radical comprising a decarboxylated residue derived from an aromatic dicarboxylic acid.

5. The composition of claim 1, wherein the ratio of the total amount of P- and N-containing compounds over the polyester is between 0.35 and 0.58.

6. The composition of claim 1, wherein the ratio of the P-containing compound over the N-containing compound is between 0.8 and 2.5.

7. The composition of claim 1, wherein the ratio of the P-containing compound over the N-containing compound is higher than 1.0.

8. The composition of claim 7, wherein the ratio of the P-containing compound over the N-containing compound is between 1.0 and 3.0.

9. The composition of claim 1, wherein the N-containing compound is a melamine derivative as melamine cyanurate, melamine pyrophosphate or melamine polyphosphate.

10. The composition of claim 1, wherein the phosphorus-based compound is bisphenol A-diphosphate.

11. The composition of claim 1, wherein the phosphorus containing compound is tetraxylyl piperazine diphosphoramide.

12. The composition of claim 1, wherein the anti-dripping agent is present in an amount of 0.02–2 weight percent of the total composition.

13. The composition of claim 1, wherein the anti-dripping agent is poly(tetrafluoroethylene).

14. The composition of claim 1, further comprising up to about 60 weight percent of alumina, amorphous silica, anhydrous aluminum silicates, mica, feldspar, clays, talc, glass flake, glass fibers, glass microspheres, wollastonite, metal oxides, ground quartz, and mixtures thereof.

15. The composition of claim 1, wherein the polyester component further comprises another polyester resin different from poly(ethylene terephthalate).

16. The composition of claim 15, wherein the polyester resin different from poly(ethylene terephthalate) is poly(butylene terephthalate).

17. The composition of claim 16, wherein the poly(ethylene terephthalate) and the poly(butylene terephthalate) are present in a weight ratio of at least 55/45.

18. The composition of claim 17, wherein the phosphorus-containing pound is bisphenol-A diphosphate.

19. The composition of claim 18, wherein the ratio of the P-containing compound over the N-containing compound is between 1.0 and 3.0.

20. The composition of claim 19, wherein the ratio of the P-containing compound over the N-containing compound is between 1.2 and 2.5.

21. The composition of claim 18, wherein the N-containing compound is melamine cyanurate.

22. The composition of claim 21, wherein the ratio of the P-containing compound over the N-containing compound is between 1.0 and 3.0.

23. The composition of claim 21, wherein the ratio of the P-containing compound over the N-containing compound is between 1.2 and 2.5.

24. The composition of claim 8, wherein the ratio of the P-containing compound over the N-containing compound is between 1.2 and 2.5.

25. The composition of claim 9, wherein the phosphorus-containing compound is bisphenol A-diphosphate.

26. The composition of claim 25, wherein the ratio of the P-containing compound over the N-containing compound is between 1.0 and 3.0.

27. The composition of claim 26, wherein the ratio of the P-containing compound over the N-containing compound is between 1.2 and 2.5.

28. The composition of claim 1, wherein the anti-dripping agent is present in an amount of 0.05 to 1 weight percent of the total composition.

29. The composition of claim 10, wherein the N-containing compound is melamine cyanurate.

30. The composition of claim 29, wherein the ratio of the P-containing compound over the N-containing compound is between 1.0 and 3.0.

31. The composition of claim 29, wherein the ratio of the P-containing compound over the N-containing compound is between 1.2 and 2.5.

* * * * *